(12) United States Patent
Tayagaki et al.

(10) Patent No.: US 10,030,115 B2
(45) Date of Patent: Jul. 24, 2018

(54) HEAT-EXPANDABLE MICROSPHERES, PROCESS FOR PRODUCING THE SAME, AND APPLICATION THEREOF

(71) Applicant: MATSUMOTO YUSHI-SEIYAKU CO., LTD., Yao-shi, Osaka (JP)

(72) Inventors: Naoya Tayagaki, Yao (JP); Katsushi Miki, Yao (JP)

(73) Assignee: MATSUMOTO YUSHI-SEIYAKU CO., LTD., Yao-shi, Osaka (JP)

( * ) Notice: Subject to any disclaimer, the term of this patent is extended or adjusted under 35 U.S.C. 154(b) by 0 days.

(21) Appl. No.: 15/028,133

(22) PCT Filed: Oct. 2, 2014

(86) PCT No.: PCT/JP2014/076342
§ 371 (c)(1),
(2) Date: Apr. 8, 2016

(87) PCT Pub. No.: WO2015/060086
PCT Pub. Date: Apr. 30, 2015

(65) Prior Publication Data
US 2016/0237234 A1   Aug. 18, 2016

(30) Foreign Application Priority Data
Oct. 24, 2013   (JP) ................................ 2013-221149

(51) Int. Cl.
| | |
|---|---|
| *C08J 9/20* | (2006.01) |
| *C08J 9/32* | (2006.01) |
| *C08J 9/228* | (2006.01) |
| *C08F 2/18* | (2006.01) |
| *B01J 13/14* | (2006.01) |
| *C08F 220/40* | (2006.01) |
| *C08F 220/14* | (2006.01) |
| *B01J 13/02* | (2006.01) |
| *B01J 13/06* | (2006.01) |

(52) U.S. Cl.
CPC ................. *C08J 9/20* (2013.01); *B01J 13/14* (2013.01); *C08F 2/18* (2013.01); *C08J 9/228* (2013.01); *C08J 9/32* (2013.01); *B01J 13/02* (2013.01); *B01J 13/06* (2013.01); *C08J 2201/024* (2013.01); *C08J 2203/22* (2013.01); *C08J 2333/20* (2013.01)

(58) Field of Classification Search
CPC ... B01J 13/02; B01J 13/06; B01J 13/14; C08J 9/32; C08J 2203/02
See application file for complete search history.

(56) References Cited

U.S. PATENT DOCUMENTS

| | | |
|---|---|---|
| 3,615,972 A | 10/1971 | Morehouse, Jr. |
| 2003/0114546 A1 | 6/2003 | Satake et al. |
| 2003/0143399 A1 | 7/2003 | Satake et al. |
| 2009/0176098 A1 | 7/2009 | Masuda et al. |
| 2011/0123807 A1 | 5/2011 | Jun et al. |
| 2012/0064347 A1* | 3/2012 | Kita ....................... B01J 13/185 428/402.24 |
| 2013/0030065 A1 | 1/2013 | Masuda et al. |

FOREIGN PATENT DOCUMENTS

| | | |
|---|---|---|
| JP | 42-26524 A | 12/1967 |
| JP | 2002-012693 A | 1/2002 |
| JP | 2012-513487 A | 6/2012 |
| WO | 2007/046273 A1 | 4/2007 |
| WO | 2010/072663 A1 | 7/2010 |

OTHER PUBLICATIONS

International Search Report of PCT/JP2014/076342 dated Nov. 25, 2014.

* cited by examiner

*Primary Examiner* — Melissa A Rioja
(74) *Attorney, Agent, or Firm* — Sughrue Mion, PLLC

(57) ABSTRACT

Heat-expandable microspheres composed of a thermoplastic resin shell and a thermally-vaporizable blowing agent encapsulated therein, and having an average particle size ranging from 1 to 100 μm. The amount of DMF-insoluble matter ($G_1$) and the amount of DMF-MEK-insoluble matter ($G_2$) constituting the heat-expandable microspheres satisfy $1.05 < G_2/G_1$. The expansion of the heat-expandable microspheres satisfy $H_{max}/T_{max} \geq 13$ (μm/° C.) where $H_{max}$ and $T_{max}$ are as defined herein. Also disclosed in a process for producing the heat-expandable microspheres which includes preparing an aqueous suspension comprising oily globules dispersed in an aqueous dispersion medium containing a hydrophilic cross-linking agent, wherein the oily globules are made of an oily mixture comprising the blowing agent and a monomer component; and polymerizing the monomer component.

7 Claims, 1 Drawing Sheet

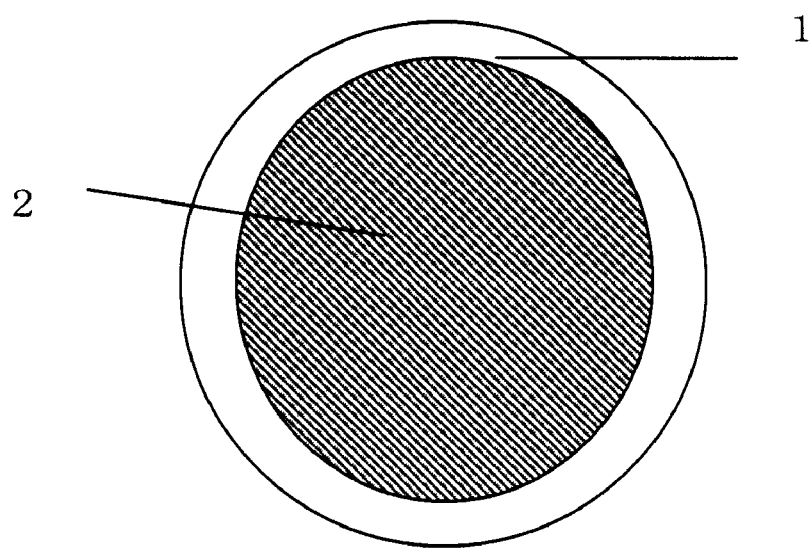

US 10,030,115 B2

HEAT-EXPANDABLE MICROSPHERES, PROCESS FOR PRODUCING THE SAME, AND APPLICATION THEREOF

CROSS REFERENCE TO RELATED APPLICATIONS

This application is a National Stage of International Application No. PCT/JP2014/076432 filed Oct. 2, 2014, claiming priority based on Japanese Patent Application No. 2013-221149 filed Oct. 24, 2013, the contents of all of which are incorporated herein by reference in their entirety.

TECHNICAL FIELD

The present invention relates to heat-expandable microspheres, a process for producing the same, and application thereof.

BACKGROUND ART

Heat-expandable microspheres, which comprise a shell of a thermoplastic resin and a blowing agent encapsulated therein, are generally called heat-expandable microcapsules. The thermoplastic resin usually includes vinylidene chloride copolymers, acrylonitrile copolymers, and acrylic acid ester copolymers. The blowing agent mainly employed includes hydrocarbons, such as isobutane and isopentane. (Refer to PTL 1).

The process for producing such heat-expandable microspheres includes a well-known process in which an oily mixture containing a monomer component having one radically-polymerizable double bond, a blowing agent such as aliphatic hydrocarbons, a cross-linking agent having at least two radically-polymerizable double bonds and a polymerization initiator is dispersed in an aqueous dispersion medium containing, for example, a dispersion stabilizer such as colloidal silica or magnesium hydroxide, and the dispersion is subjected to suspension polymerization (refer to PTL 2).

Heat-expandable microspheres have been employed in various applications including imparting design or functionality to articles or reducing the weight of articles, and demand for higher performance of such articles in each application is increasing recently. Along with such a trend, demand for higher performance of heat-expandable microspheres is also increasing.

An example of such applications is a process of manufacturing formed products or sheets by expanding heat-expandable microspheres in vinyl chloride paste or compositions of resins such as polyurethane resin during the processing of such compositions.

The expansion performance of heat-expandable microspheres in a composition being subjected to processing is greatly influenced by the processing conditions, and such influence sometimes causes defects in the resultant formed products or sheets.

Specifically, the influence causes problems such as shrinkage of heat-expandable microspheres due to the escape of vaporized blowing agent from the microspheres heated at high temperature or for a long time, even if the heat-expandable microspheres show sufficient thermal expansion performance in heating at a comparatively low temperature and for a short time. Such deteriorated thermal expansion performance of the microspheres leads to the problems including a poor effect of imparting design or functionality to formed products or sheets or failure to reduce their weight.

For solving the significant temperature-dependency of heat-expandable microspheres in processing, a process for producing a polymer for heat-expandable microspheres that is less temperature dependent has been proposed. The process produces the polymer by increasing the amount of a cross-linking agent (polymerizable monomer having at least two polymerizable double bonds) added to an oily mixture containing polymerizable monomers in order to increase the degree of cross-linking of the polymer (as a whole) which forms the shell of heat-expandable microspheres so as to make the polymer less temperature dependent. The process, however, caused a problem in that the increased cross-linking density of the polymer can lead to decreased thermoplasticity of the whole of the shell. Such a shell does not sufficiently soften along with the increased internal pressure of the encapsulated blowing agent, and thus the resultant heat-expandable microspheres have poor thermal expansion performance.

CITATION LIST

Patent Literature

[PTL 1] U.S. Pat. No. 3,615,972
[PTL 2] Examined Patent Publication No. 42-26524

SUMMARY OF THE INVENTION

Technical Problem

The present invention provides heat-expandable microspheres of high thermal expansion performance, a process for producing the same and applications thereof.

Solution to Problem

The inventors of the present invention diligently studied to solve the problems mentioned above, and found that heat-expandable microspheres produced by polymerization with a hydrophilic cross-linking agent can be used to solve the problem. Thus the inventors have completed the present invention.

In a first aspect, the heat-expandable microspheres of the invention comprise a thermoplastic resin shell and thermally-vaporizable blowing agent encapsulated therein, and have an average particle size ranging from 1 to 100 μm, wherein an amount of DMF-insoluble matter ($G_1$) and an amount of DMF-MEK-insoluble matter ($G_2$) constituting the heat-expandable microspheres satisfy the expression $1.05 < G_2/G_1$.

In a second aspect, the heat-expandable microspheres of the invention comprise a thermoplastic resin shell and a thermally-vaporizable blowing agent encapsulated therein, and have an average particle size ranging from 1 to 100 μm, wherein expansion of the heat-expandable microspheres satisfies $H_{max}/T_{max} \geq 13$ (μm/° C.), measured as follows: the heat-expandable microspheres are heated with increasing temperature from 20 to 300° C. at a rate of 10° C./min in a pressurizing state with a compression unit to 0.01N to thereby expand the heat-expandable microspheres; the height of the position of the compression unit changed vertically by the expanded microspheres is measured; and the temperature at which the compression unit reaches the highest position ($H_{max}$, μm) is defined as the maximum expansion temperature ($T_{max}$, ° C.).

The heat-expandable microspheres of the first aspect of the invention may satisfy the constituent features of the heat-expandable microspheres of the second aspect of the invention, and vice-versa.

In a preferred embodiment, the thermoplastic resin is polymerized from a monomer component comprising a nitrile monomer.

In a third aspect, the invention provides a process for producing heat-expandable microspheres comprising a thermoplastic resin shell and a thermally-vaporizable blowing agent encapsulated therein, and having an average particle size ranging from 1 to 100 μm, the process comprising; preparing an aqueous suspension comprising oily globules dispersed in an aqueous dispersion medium containing a hydrophilic cross-linking agent, wherein the oily globules are made of an oily mixture comprising the blowing agent and a monomer component; and polymerizing the monomer component.

In a fourth aspect, the invention provides a process for producing heat-expandable microspheres comprising a thermoplastic resin shell and a thermally-vaporizable blowing agent encapsulated therein and having an average particle size ranging from 1 to 100 μm, the process comprising; dispersing in advance an oily mixture into an aqueous dispersion medium containing a hydrophilic cross-linking agent, wherein the oily mixture comprises the blowing agent and a monomer component; preparing an aqueous suspension comprising oily globules made of the oily mixture dispersed in the aqueous dispersion medium; and polymerizing the monomer component.

The process for producing the heat-expandable microspheres of the third aspect of the present invention may satisfy the constituent features of the process for producing the heat-expandable microspheres of the fourth aspect of the present invention, and vice-versa.

In a preferred embodiment, the aqueous dispersion medium contains a hydrophilic cross-linking agent in an amount at least 0.01 parts by weight to 100 parts by weight of the monomer component.

In yet another preferred embodiment, the monomer component contains a nitrile monomer.

In yet another preferred embodiment, the globules comprise one or both of the hydrophilic cross-linking agent and a lipophilic cross-linking agent.

In yet another preferred embodiment, the amount of the hydrophilic cross-linking agent is at least 5 wt % of the entire amount of cross-linking agent contained in the aqueous dispersion medium.

The hollow particles of the present invention are produced by heating and expanding the heat-expandable microspheres described above and/or the heat-expandable microspheres produced in the process described above.

The composition of the present invention contains a particulate material selected from the group consisting of the heat-expandable microspheres described above, the heat-expandable microspheres produced in the process described above and the hollow particles described above and a base component.

The formed product of the present invention is produced by forming the composition described above.

Advantageous Effects of Invention

The heat-expandable microspheres of the present invention have a high thermal expansion performance.

The process for producing the heat-expandable microspheres of the invention can efficiently produce heat-expandable microspheres having a high thermal expansion performance.

The hollow particles of the present invention produced from the heat-expandable microspheres have a light weight.

The composition of the present invention containing the heat-expandable microspheres and/or hollow particles has high thermal expansion performance.

The formed product of the present invention produced by forming the composition mentioned above is lightweight.

BRIEF DESCRIPTION OF THE DRAWINGS

The drawing is a schematic diagram illustrating an example of the heat-expandable microspheres

REFERENCE SIGNS LIST

1 Shell of thermoplastic resin
2 Blowing agent

DESCRIPTION OF EMBODIMENTS

Process for Producing Heat-expandable Microspheres

The process for producing heat-expandable microspheres of the present invention produces heat-expandable microspheres composed of a shell of thermoplastic resin and a thermally-vaporizable blowing agent encapsulated therein. The average particle size of the heat-expandable microspheres should preferably range, for example, from 1 to 100 μm.

The blowing agent is not specifically restricted, except that it should be a thermally vaporizable substance, and includes, for example, $C_3$-$C_{13}$ hydrocarbons such as propane, (iso)butane, (iso)pentane, (iso)hexane, (iso)heptane, (iso)octane, (iso)nonane, (iso)decane, (iso)undecane, (iso)dodecane and (iso)tridecane; hydrocarbons having a carbon number greater than 13 and not greater than 20, such as (iso)hexadecane and (iso)eicosane; hydrocarbons from petroleum fractions such as pseudocumene, petroleum ether, and normal paraffins and isoparaffins having an initial boiling point ranging from 150 to 260° C. and/or being distilled at a temperature ranging from 70 to 360° C.; halides of $C_1$-$C_{12}$ hydrocarbons, such as methyl chloride, methylene chloride, chloroform and carbon tetrachloride; fluorine-containing compounds, such as hydrofluoroether; silanes having $C_1$-$C_5$ alkyl groups, such as tetramethyl silane, trimethylethyl silane, trimethylisopropyl silane and trimethyl-n-propyl silane; and compounds which thermally decompose to generate gases, such as azodicarbonamide, N,N'-dinitrosopentamethylenetetramine and 4,4'-oxybis(benzenesulfonyl hydrazide). One of or a combination of at least two of those blowing agents can be employed. The blowing agents may be any of linear, branched or alicyclic compounds, and should preferably be aliphatic compounds.

The blowing agent is thermally vaporizable. A blowing agent encapsulated in heat-expandable microspheres should preferably have a boiling point not higher than the softening point of the thermoplastic resin shell of the microspheres, because such agent can generate vapor to a pressure sufficient to expand the heat-expandable microspheres at their expanding temperature and attain high expansion ratio. In addition, another blowing agent having a boiling point higher than the softening point of the thermoplastic resin shell can be encapsulated along with the blowing agent having a boiling point not higher than the softening point of the thermoplastic resin shell.

The monomer component is polymerized (preferably in the presence of a polymerization initiator) into thermoplastic resin which forms the shell of heat-expandable microspheres.

The monomer component contains a (radically) polymerizable monomer having one polymerizable double bond. The monomer component is not specifically restricted, and includes, for example, nitrile monomers such as acrylonitrile, methacrylonitrile, fumaronitrile and maleonitrile; halogenated vinyl monomers, such as vinyl chloride; halogenated vinylidene monomers, such as vinylidene chloride; vinyl ester monomers, such as vinyl acetate, vinyl propionate, and vinyl butyrate; carboxyl-group-containing monomers, such as unsaturated monocarboxylic acids including acrylic acid, methacrylic acid, ethacrylic acid, crotonic acid and cinnamic acid, unsaturated dicarboxylic acids including maleic acid, itaconic acid, fumaric acid, citraconic acid and chloromaleic acid, anhydrides of unsaturated dicarboxylic acids, and monoesters of unsaturated dicarboxylic acids including monomethyl maleate, monoethyl maleate, monobutyl maleate, monomethyl fumarate, monoethyl fumarate, monomethyl itaconate, monoethyl itaconate and monobutyl itaconate; (meth)acrylic acid ester monomers, such as methyl (meth)acrylate, ethyl (meth)acrylate, n-butyl (meth)acrylate, t-butyl (meth)acrylate, 2-ethylhexyl (meth)acrylate, stearyl (meth)acrylate, phenyl (meth)acrylate, isobornyl (meth)acrylate, cyclohexyl (meth)acrylate, benzyl (meth)acrylate and 2-hydroxyethyl (meth)acrylate; (meth)acrylamide monomers, such as acrylamide, substituted acrylamide, methacrylamide and substituted methacrylamide; maleimide monomers, such as N-phenyl maleimide and N-cyclohexyl maleimide; styrene monomers, such as styrene and α-methyl styrene; ethylenically unsaturated monoolefin monomers, such as ethylene, propylene and isobutylene; vinyl ether monomers, such as vinyl methyl ether, vinyl ethyl ether and vinyl isobutyl ether; vinyl ketone monomers, such as vinyl methyl ketone; N-vinyl monomers, such as N-vinyl carbazole and N-vinyl pyrolidone; and vinylnaphthalene salts. Some of or whole of the carboxyl groups in the carboxyl-group-containing monomers may be neutralized during or after the polymerization. Acrylic acids and methacrylic acids may be collectively referred to as (meth)acrylic acids, and the term, (meth)acryl, means acryl or methacryl.

Of those carboxyl-group-containing monomers, acrylic acid, methacrylic acid, maleic acid, maleic acid anhydride and itaconic acid are preferable, acrylic acid and methacrylic acid are more preferable, and methacrylic acid is most preferable for high heat resistance of resultant microspheres.

A monomer component essentially containing a nitrile monomer is preferable for improving the gas-barrier performance, thermal expansion performance, heat resistance and solvent resistance of the thermoplastic resin constituting the shell of heat-expandable microspheres.

The nitrile monomer should preferably contain acrylonitrile and/or methacrylonitrile for achieving high gas-barrier performance and improving the thermal expansion performance of heat-expandable microspheres.

The weight ratio of methacrylonitrile in the nitrile monomer should preferably range from 5 to 90 wt %, more preferably from 15 to 80 wt %, and most preferably from 20 to 70 wt %. The weight ratio of methacrylonitrile within the range will attain high film forming performance of thermoplastic resin to densify the shell and achieve high thermal expansion performance of resultant microspheres.

The monomer component should preferably contain at least one monomer (hereinafter sometimes referred to as the monomer A) selected from the group consisting of halogenated vinylidene monomers, (meth)acrylic acid ester monomers and styrene monomers, in addition to the nitrile monomer. The monomer component containing a vinylidene chloride monomer improves the gas-barrier performance of the resultant thermoplastic resin shell. The monomer component containing a (meth)acrylic acid ester monomer makes the expanding behavior of microspheres readily controllable. The monomer component containing a styrene monomer reduces the byproduct, residue from polymerization, in the manufacturing process to improve the stability of the production of heat-expandable microspheres.

The weight ratio of the monomer A should preferably range from 1 to 80 wt % of the sum of the nitrile monomer and monomer A, more preferably from 5 to 70 wt %, and most preferably from 15 to 60 wt %. A weight ratio of the monomer A less than 1 wt % may fail to control the expansion behavior of the microspheres or improve the stability of the production of the microspheres. On the other hand a weight ratio of the monomer A greater than 80 wt % may fail to produce heat-expandable microspheres having high heat and solvent resistance and good thermal expansion performance.

The monomer component should preferably contain a carboxyl-group-containing monomer along with a nitrile monomer, because such monomer component improves heat and solvent resistance of resultant thermoplastic resin shell and also increases the glass-transition point of the thermoplastic resin to make heat-expandable microspheres expand at high temperature and improve thermal expansion performance of the microspheres.

The weight ratio of the sum of the nitrile monomer and carboxyl-group-containing monomer in the monomer component should preferably be at least 50 wt %, more preferably at least 60 wt %, further more preferably at least 70 wt %, yet further more preferably at least 80 wt %, and most preferably at least 90 wt %. A weight ratio of the sum of the nitrile monomer and carboxyl-group-containing monomer less than 50 wt % results in insufficient gas-barrier performance and heat resistance and solvent resistance of the resultant microspheres to cause insufficient thermal expansion performance.

In a monomer component further containing a carboxyl-group-containing monomer along with a nitrile monomer, the weight ratio of the carboxyl-group-containing monomer in the sum of the carboxyl-group-containing monomer and nitrile monomer should preferably range from 10 to 90 wt %, more preferably from 30 to 90 wt %, further more preferably from 40 to 90 wt %, yet further more preferably from above 51.2 wt % to 90 wt %, and most preferably from 53 to 90 wt %. A weight ratio of the carboxyl-group-containing monomer lower than 10 wt % may fail to impart sufficient heat and solvent resistance to resultant microspheres and consequently fail to attain good thermal expansion performance of the microspheres. On the other hand, a weight ratio of the carboxyl-group-containing monomer higher than 90 wt % may degrade the thermal expansion performance of resultant heat-expandable microspheres.

The monomer component may further contain a halogenated vinylidene monomer and/or (meth)acrylic acid ester monomer along with the nitrile monomer and carboxyl-group-containing monomer.

A monomer component further containing a maleimide monomer in addition to the monomers mentioned above is preferable for minimized coloration of heat-expandable microspheres.

The thermoplastic resin shell is produced in suspension polymerization with the monomer components mentioned above and a polymerizable monomer having at least two polymerizable double bonds, i.e., a cross-linking agent. Polymerization with a cross-linking agent makes a network structure in the thermoplastic resin which minimizes the decrease of the retention (encapsulation) of a blowing agent in thermally expanded microspheres so as to achieve sufficient thermal expansion of the microspheres.

The cross-linking agents employed in the present invention fall into hydrophilic cross-linking agents and lipophilic cross-linking agents.

The hydrophilic cross-linking agents are defined to be those soluble by at least 0.01 g in 100 g of water at 30° C. The amount of the hydrophilic cross-linking agents soluble in 100 g of water at 30° C. should preferably be at least 0.02 g, more preferably at least 0.03 g, further more preferably at least 0.04 g, yet further more preferably at least 0.05 g, and most preferably at least 0.06 g. The upper limit of the amount of the hydrophilic cross-linking agents soluble in 100 g of water is 20 g.

The lipophilic cross-linking agents are defined to be those soluble by less than 0.01 g in 100 g of water at 30° C. The amount of lipophilic cross-linking agents soluble in 100 g of water at 30° C. should preferably be not more than 0.008 g, more preferably not more than 0.006 g, further more preferably not more than 0.004 g, yet further more preferably not more than 0.002 g, and most preferably not more than 0.001 g. The lower limit of the amount of the lipophilic cross-linking agents soluble in 100 g of water is 0 g.

The hydrophilic cross-linking agents include, for example, a compound having a hydrophilic group and/or a compound having high polarity. The hydrophilic group mentioned here includes, for example, hydroxyl group and oxyalkylene group. Compounds of high polarity are those having a large dipole moment in the molecule, in other words, having a higher degree of polarization, i.e., localized electric charge in a molecule caused by localization of electrons. Such compounds of high polarity include, for example, heterocyclic compounds.

The hydrophilic cross-linking agent includes, for example, the compounds (1) to (6) shown below. One of or a combination of at least two of those compounds can be employed.

The compound (1) is a hydrophilic cross-linking agent represented by the chemical formula (1) shown below.

$$R(OA^1)_{n1}OR \quad (1)$$

where R is (meth)acryloyl group and each of two Rs in the molecule may be the same or different; $A^1$ is an alkylene group having a carbon number of 1 to 4 (preferably 2 to 3); and n1 is a positive number of at least 1 (preferably 1 to 30 and more preferably 1 to 25).

The hydrophilic cross-linking agent represented by the compound (1) includes, for example, ethylene glycol di(meth)acrylate, diethylene glycol di(meth)acrylate, triethylene glycol di(meth)acrylate, PEG(200) di(meth)acrylate, PEG (400) di(meth)acrylate, PEG(600) di(meth)acrylate, PEG (1000) di(meth)acrylate, dipropylene glycol di(meth)acrylate, tripropylene glycol di(meth)acrylate, PPG(400) di(meth)acrylate, PPG(700) di(meth)acrylate, polytetramethylene glycol di(meth)acrylate, PTMG(650) di(meth)acrylate and ethoxylated PPG(700) di(meth)acrylate.

The compound (2) is a hydrophilic cross-linking agent represented by the chemical formula (2) shown below.

[Chem. 1]

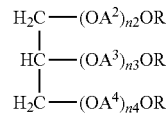

where R is (meth)acryloyl group and each of three Rs in the molecule may be the same or different; each of $A^2$ to $A^4$ is an alkylene group having a carbon number of 1 to 4 (preferably 2 to 3) and may be the same or different; and each of n2 to n4 is a positive number of at least 1 (preferably 1 to 30 and more preferably 1 to 25) and the sum of n2 to n4 is at least 6 (preferably 8 to 40).

The hydrophilic cross-linking agent represented by the compound (2) includes, for example, ethoxylated glycerin triacrylate.

The compound (3) is a hydrophilic cross-linking agent represented by the chemical formula (3) shown below.

[Chem. 2]

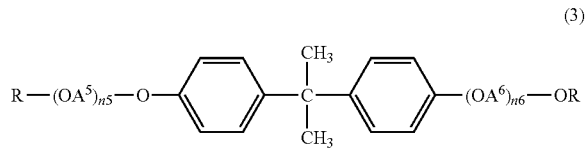

where R is (meth)acryloyl group and each of two Rs in the molecule may be the same or different; each of $A^5$ and $A^6$ is an alkylene group having a carbon number of 1 to 4 (preferably 2 to 3) and may be the same or different; and each of n5 and n6 is a positive number of at least 1 (preferably 1 to 30 and more preferably 2 to 20) and may be the same or different, and the sum of n5 and n6 is at least 6 (preferably 8 to 40).

The hydrophilic cross-linking agent represented by the compound (3) includes, for example, ethoxylated bisphenol A di(meth)acrylate, propoxylated-ethoxylated bisphenol A di(meth)acrylate, and propoxylated-ethoxylated bisphenol A di(meth)acrylate.

The compound (4) is a hydrophilic cross-linking agent having a similar structure to the chemical formula (2) except that n2 to n4 are 0, two of three Rs are (meth)acryloyl groups which may be the same or different, and the remaining R is a hydrogen atom.

The hydrophilic cross-linking agent represented by the compound (4) includes, for example, glycerin di(meth)acrylate and 2-hydroxy-3-acryloyloxypropyl methacrylate.

The compound (5) is a hydrophilic cross-linking agent represented by the chemical formula (4) shown below.

[Chem. 3]

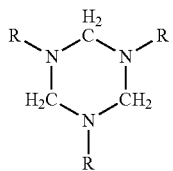

(4)

where R is (meth)acryloyl group and each of three Rs in the molecule may be the same or different.

The hydrophilic cross-linking agent represented by the compound (5) includes, for example, 1,3,5-tri(meth)acryloylhexahydro-1,3,5-triazine.

The compound (6) is a hydrophilic cross-linking agent represented by the chemical formula (5) shown below.

[Chem. 4]

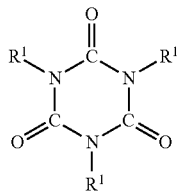

(5)

where R1 is $C^2$-$C^4$ alkenyl group (preferably vinyl or allyl group) and each of three R1s in the molecule may be the same or different.

The hydrophilic cross-linking agent represented by the compound (6) includes, for example, triallyl isocyanurate.

The preferable hydrophilic cross-linking agent includes, for example, ethyleneglycol di(meth)acrylate, diethyleneglycol di(meth)acrylate, triethyleneglycol di(meth)acrylate, dipropyleneglycol di(meth)acrylate, PEG(200) di(meth)acrylate, PEG(400) di(meth)acrylate, PEG(600) di(meth)acrylate, PEG(1000) di(meth)acrylate, tripropyleneglycol di(meth)acrylate, PPG(400) di(meth)acrylate, PPG(700) di(meth)acrylate, polytetramethyleneglycol di(meth)acrylate, PTMG(650) di(meth)acrylate, ethoxylated PPG(700) di(meth)acrylate (at least 6 moles of EO and at least 8 moles of PO are added), ethoxylated glycerin triacrylate (at least 9 moles of EO are added), glycerin di(meth)acrylate, 2-hydroxy-3-acryloyloxypropyl methacrylate, ethoxylated bisphenol A di(meth)acrylate (at least 8 moles of EO are added), propoxylated bisphenol A di(meth)acrylate (at least 8 moles of EO are added), propoxylated-ethoxylated bisphenol A di(meth)acrylate (at least 6 moles of EO and at least 8 moles of PO are added), 1,3,5-tri(meth)acryloylhexahydro-1,3,5-triazine, and triallyl isocyanurate. In the above description, PEG means polyethylene glycol. These hydrophilic cross-linking agents increase the ratio of the hydrophilic cross-linking agent in the aqueous dispersion medium of an aqueous suspension and facilitate cross-linking to result in higher cross-linking density of the outermost layer of the shell of microspheres than that of other parts of the shell. Consequently, the resultant heat-expandable microspheres have improved thermal expansion performance owing to minimized escape of vaporized blowing agent from the microspheres.

More preferable hydrophilic cross-linking agents are, for example, 1,3,5-triacryloylhexahydro-1,3,5-triazine and triallyl isocyanurate, and their trifunctional structure contributes to increased rigidity and improved solvent and heat resistance of resultant microspheres.

The lipophilic cross-linking agent is not specifically restricted except that the agent dissolves by less than 0.01 g in 100 g of water at 30° C. Any cross-linking agents except hydrophilic cross-linking agents can be employed as the lipophilic cross-linking agent.

The lipophilic cross-linking agent is not specifically restricted, and includes, for example, di(meth)acrylates, such as 1,4-butanediol di(meth)acrylate, 1,6-hexanediol di(meth)acrylate, 1,9-nonanediol di(meth)acrylate, 1,10-decanediol di(meth)acrylate, neopentyl glycol di(meth)acrylate, 3-methyl-1,5-pentanediol di(meth)acrylate, 2-methyl-1,8-octanediol di(meth)acrylate and dimethyloltricyclodecane di(meth)acrylate; tri(meth)acrylates, such as pentaerythritol tri(meth)acrylate and trimethylpropane tri(meth)acrylate; tetra(meth)acrylates, such as ditrimethylolpropane tetra(meth)acrylate and pentaerythritol tetra(meth)acrylate; hexa(meth)acrylates, such as dipentaerythritol hexa(meth)acrylate; and vinyl benzenes, such as divinyl benzene and 1,2,4-trivinyl benzene. One of or combination of at least two of these lipophilic cross-linking agents may be employed.

The amount of the cross-linking agent used in the polymerization is not specifically restricted but should preferably range from 0.01 to 5 parts by weight, more preferably from 0.05 to 2 parts by weight, further more preferably from 0.1 to 1.5 parts by weight and most preferably from 0.2 to 1 parts by weight to 100 parts by weight of a monomer component. An amount of the cross-linking agent less than 0.01 parts by weight to 100 parts by weight of a monomer component may fail to attain sufficient heat and solvent resistance of resultant microspheres or fail to minimize the escape of vaporized blowing agent from the microspheres to deteriorate the thermal expansion performance of the microspheres. On the other hand, an amount of the cross-linking agent greater than 5 parts by weight may cause excessively high cross-linking density of the shell of heat-expandable microspheres to make the shell poorly thermoplastic and fail to attain good thermal expansion performance of the microspheres. The amount of the cross-linking agent may range from 0 to less than 0.01 parts by weight to 100 parts by weight of the monomer component.

The weight ratio of the hydrophilic cross-linking agent in the cross-linking agent used in polymerization is not specifically restricted but should preferably be at least 20 wt %, more preferably at least 30 wt %, further more preferably at least 40 wt %, and most preferably at least 50 wt %. The upper limit of the hydrophilic cross-linking agent in the cross-linking agent used in polymerization is 100 wt %. The cross-linking agent containing less than 20 wt % of the hydrophilic cross-linking agent to be used in polymerization may cause insufficient softness of the whole of the shell of heat-expandable microspheres to degrade the thermal expansion performance of the microspheres.

The weight ratio of the lipophilic cross-linking agent in the cross-linking agent used in polymerization is not specifically restricted but should preferably be less than 80 wt %, more preferably less than 70 wt %, further more preferably less than 60 wt %, and most preferably less than 50 wt %. The lower limit of the lipophilic cross-linking agent in the cross-linking agent used in polymerization is 0 wt %. The cross-linking agent containing 80 wt % or more of the lipophilic cross-linking agent to be used in polymerization may cause insufficient softness of the whole of the shell of heat-expandable microspheres to degrade the thermal expansion performance of the microspheres.

In the polymerization of the process of the present invention, an aqueous suspension is prepared by dispersing an oily mixture essentially containing a blowing agent and monomer component into globules in an aqueous dispersion medium. Then the monomer component is polymerized to be processed into the shell of a thermoplastic resin.

If the hydrophilic cross-linking agent is contained in the aqueous dispersion medium (the state is hereinafter sometimes referred to as "state A"), it is estimated that the hydrophilic cross-linking agent existing near the interface between the globules of the oily mixture and the aqueous dispersion medium (i.e., oil-water interface) crosslinks the monomer component in the globules at the interface concurrently with the polymerization of the monomer component at the polymerization step (especially at the step of forming the shell of heat-expandable microspheres). Thus the cross-linking density of the outermost layer of the thermoplastic resin shell will become higher than that of other parts of the shell to minimize the escape of vaporized blowing agent from the microspheres. Simultaneously, the thermoplastic resin shell as a whole retains softness to attain high thermal expansion performance of the resultant heat-expandable microspheres. In addition, the high cross-linking density of the outermost layer of the shell mentioned above makes the thermoplastic resin shell durable against dissolution or swelling by solvents to attain high solvent resistance of the resultant heat-expandable microspheres.

For making the "state A", an oily mixture essentially containing a blowing agent and monomer component is dispersed in an aqueous dispersion medium containing a hydrophilic cross-linking agent to be prepared into an aqueous suspension in which globules of the oily mixture are dispersed in the aqueous dispersion medium. The aqueous suspension is preferable for efficient cross-linking of the monomer component by the hydrophilic cross-linking agent at the interface of the globules and the aqueous dispersion medium (i.e., oil-water interface). The "state A" can also be made by dispersing the oily mixture in an aqueous dispersion medium to prepare an aqueous suspension in which the globules are dispersed in the aqueous dispersion medium, and then mixing the aqueous suspension with a hydrophilic cross-linking agent.

The weight ratio of the hydrophilic cross-linking agent in the aqueous dispersion medium is not specifically restricted, but should preferably range from 0.01 to 5 parts by weight to 100 parts by weight of the monomer component at the start of the polymerization, more preferably from 0.02 to 3 parts by weight, further more preferably from 0.05 to 2 parts by weight, yet further more preferably from 0.06 to 1.5 parts by weight, and most preferably from 0.1 to 1.0 parts by weight.

A weight ratio of the hydrophilic cross-linking agent in the aqueous dispersion medium less than 0.01 parts by weight to 100 parts by weight of the monomer component may fail to improve the thermal expansion performance of resultant heat-expandable microspheres. On the other hand, a weight ratio of the hydrophilic cross-linking agent in the aqueous dispersion medium greater than 5 parts by weight to 100 parts by weight of the monomer component may cause excessively high cross-linking density of the outermost layer of the shell of heat-expandable microspheres to make the shell poorly thermoplastic and fail to attain good thermal expansion performance of the microspheres. The excessive amount of the hydrophilic cross-linking agent may also cause troubles in polymerization, such as aggregation of the resultant heat-expandable microspheres or scale on the inside wall of the polymerization reactor due to the adhesion of polymers.

It is preferable that the oily mixture dispersed into globules further contains a hydrophilic cross-linking agent and/or lipophilic cross-linking agent along with a blowing agent and monomer component in order to increase the cross-linking density of the whole of the shell of heat-expandable microspheres and improve the solvent resistance of the microspheres. It is further preferable that the oily mixture further contains both a hydrophilic cross-linking agent and lipophilic cross-linking agent.

The weight ratio of the hydrophilic cross-linking agent in the oily mixture dispersed into globules is not specifically restricted, but should preferably be at least 0.01 parts by weight to 100 parts by weight of the monomer component, more preferably at least 0.03 parts by weight, further more preferably at least 0.05 parts by weight, yet further more preferably at least 0.08 parts by weight, and most preferably at least 0.1 parts by weight at the time of preparing the aqueous suspension and starting the polymerization. Such weight ratio may improve the gas-barrier performance of the shell of heat-expandable microspheres so as to improve thermal expansion performance of the microspheres. The upper limit of the weight ratio of the hydrophilic cross-linking agent in the oily mixture is 1.0 part by weight to 100 parts by weight of the monomer component. A weight ratio of the hydrophilic cross-linking agent greater than 1.0 part by weight may cause excessively high cross-linking density of the whole of the shell of heat-expandable microspheres to make the shell poorly thermoplastic and fail to attain good thermal expansion performance of the microspheres.

The weight ratio of the lipophilic cross-linking agent in the oily mixture dispersed into globules is not specifically restricted, but should preferably be less than 1.0 part by weight to 100 parts by weight of the monomer component, more preferably less than 0.8 parts by weight, further more preferably less than 0.5 parts by weight, yet further more preferably less than 0.4 parts by weight, and most preferably less than 0.3 parts by weight at the time of preparing the aqueous suspension and starting the polymerization. Such weight ratio controls excessively high cross-linking density of the whole of the shell of heat-expandable microspheres to retain sufficient thermoplasticity and improve the heat resistance of the shell so as to achieve good thermal expansion performance of the microspheres.

The weight ratio of the hydrophilic cross-linking agent in the aqueous dispersion medium to the whole of the cross-linking agent is not specifically restricted, but should preferably be at least 5 wt %, more preferably at least 10 wt %, further more preferably at least 20 wt %, yet further more preferably at least 30 wt %, and most preferably at least 40 wt %. A weight ratio of the hydrophilic cross-linking agent less than 5 wt % may fail to improve the thermal expansion performance of resultant heat-expandable microspheres.

It is preferable to polymerize the monomer component and cross-linking agent in the presence of a polymerization initiator, and the oily mixture should preferably contain the polymerization initiator.

The polymerization initiator is not specifically restricted, and includes, for example, peroxides and azo compounds.

The peroxides include, for example, peroxydicarbonates such as diisopropyl peroxydicarbonate, di-sec-butyl peroxydicarbonate, di-2-ethylhexyl peroxydicarbonate, di-2-octyl peroxydicarbonate and dibenzyl peroxydicarbonate; peroxyesters, such as t-butyl peroxypivalate, t-hexyl peroxypivalate, 1-cyclohexyl-1-methylethyl peroxyneodecanoate and t-butyl peroxy-3,5,5-trimethylhexanoate; and diacyl peroxides, such as isobutyryl peroxide, 3,5,5-trimethylhexanoyl peroxide, octanoyl peroxide, caproyl peroxide, stearoyl peroxide, lauroyl peroxide and benzoyl peroxide.

The azo compounds include, for example, 2,2'-azobis(4-methoxy-2,4-dimethyl valeronitrile), 2,2'-azobis isobutylonitrile, 2,2'-azobis(2,4-dimethyl valeronitrile), 2,2'-azobis(2-methyl propionate) and 2,2'-azobis(2-methyl butyronitrile).

One of or a combination of at least two of the polymerization initiators can be employed. The polymerization initiator should preferably be an oil-soluble polymerization initiator which is soluble in the monomer component.

The amount of the polymerization initiator is not specifically restricted but should preferably range from 0.3 to 8.0 parts by weight to 100 parts by weight of the monomer component.

In the polymerization, the oily mixture may further contain a chain-transfer agent.

The aqueous dispersion medium contains mainly water, such as deionized water, for dispersing the oily mixture, and may further contain alcohols such as methanol, ethanol and propanol, and hydrophilic organic solvents such as acetone. The amount of the aqueous dispersion medium is not specifically restricted, but should preferably range from 100 to 1,000 parts by weight to 100 parts by weight of the monomer component.

The aqueous dispersion medium may further contain an electrolyte, such as sodium chloride, magnesium chloride, calcium chloride, sodium sulfate, magnesium sulfate, ammonium sulfate and sodium carbonate. One of or a combination of at least two of those electrolytes can be employed. The amount of the electrolyte is not specifically restricted but should preferably range from 0.1 to 50 parts by weight to 100 parts by weight of the aqueous dispersion medium.

The aqueous dispersion medium may contain at least one water-soluble compound selected from the group consisting of water-soluble 1,1-substituted compounds having a structure in which a hetero atom and a hydrophilic functional group selected from the group consisting of hydroxyl group, carboxylic acid (salt) groups and phosphonic acid (salt) groups are bonded to the same carbon atom; potassium dichromate; alkali metal nitrites; metal (trivalent) halides; boric acid; water-soluble ascorbic acids; water-soluble polyphenols; water-soluble vitamin Bs; and water-soluble phosphonic acids (salts). In the present invention, the term, "water-soluble" means that at least 1 g of a substance is soluble in 100 g of water.

The amount of the water-soluble compound in the aqueous dispersion medium is not specifically restricted but should preferably range from 0.0001 to 1.0 part by weight to 100 parts by weight of the monomer component, more preferably from 0.0003 to 0.1 parts by weight, and most preferably from 0.001 to 0.05 parts by weight. An insufficient amount of the water-soluble compound may fail to sufficiently attain the effect by the water-soluble compound. On the other hand, an excessive amount of the water-soluble compound may decrease polymerization rate or increase the amount of the monomer component which remains unpolymerized after polymerization.

The aqueous dispersion medium may contain a dispersion stabilizer or dispersion-stabilizing auxiliary in addition to the electrolyte and water-soluble compound.

The dispersion stabilizer is not specifically restricted, and includes, for example, tribasic calcium phosphate; pyrophosphates produced by metathesis reaction such as magnesium pyrophosphate and calcium pyrophosphate; colloidal silica; alumina sol; and magnesium hydroxide. One of or a combination of at least two of those dispersion stabilizers can be employed.

The amount of the dispersion stabilizer should preferably range from 0.1 to 20 parts by weight, and more preferably from 0.5 to 10 parts by weight to 100 parts by weight of the monomer component.

The dispersion-stabilizing auxiliary is not specifically restricted, and includes, for example, polymeric dispersion-stabilizing auxiliaries; and surfactants, such as cationic surfactants, anionic surfactants, amphoteric surfactants and nonionic surfactants. One of or a combination of at least two of those dispersion-stabilizing auxiliaries can be employed.

The aqueous dispersion medium is prepared, for example, by blending the water-soluble compound and optionally a dispersion stabilizer and/or dispersion stabilizing auxiliary in water (deionized water). The pH of the aqueous dispersion medium in polymerization is determined according to the variants of the water-soluble compound, dispersion stabilizer and dispersion stabilizing auxiliary. For example, the pH should be controlled preferably within the acidic region for using colloidal silica as the dispersion stabilizer, while the pH should be controlled preferably within the alkaline region for using magnesium hydroxide as the dispersion stabilizer.

The polymerization may be carried out in the presence of sodium hydroxide or in the presence of sodium hydroxide and zinc chloride.

In the polymerization, the oily mixture is dispersed and suspended in the aqueous dispersion medium to form globules of prescribed particle size.

The methods for dispersing and suspending the oily mixture include generally known dispersion techniques, such as agitation with a Homo-mixer (for example, a device produced by Tokushu Kika Kogyou), dispersion with a static dispersing apparatus such as a Static mixer (for example, a device produced by Noritake Engineering Co., Ltd.), membrane emulsification technique, and ultrasonic dispersion.

Then the suspension polymerization is started by heating the aqueous suspension in which the oily mixture is dispersed into globules in the aqueous dispersion medium. During the polymerization reaction, it is preferable to gently agitate the aqueous suspension to a degree which prevents the floating of the monomer component and the sedimentation of polymerized heat-expandable microspheres.

The polymerization temperature can be freely settled according to the variant of the polymerization initiator, and should preferably be controlled within the range from 30 to 100° C., and more preferably from 40 to 90° C. The polymerization temperature should preferably be maintained for about 0.1 to 20 hours. The initial pressure for the polymerization is not specifically restricted, but should preferably be controlled within the range from 0 to 5.0 MPa, and more preferably from 0.1 to 3.0 MPa in gauge pressure.

Heat-Expandable Microspheres and their Application

The heat-expandable microspheres of the present invention comprises, as shown in the drawing, a shell (1) of a thermoplastic resin and a thermally vaporizable blowing agent (2) encapsulated therein. The thermoplastic resin comprises a polymer produced by polymerizing the monomer component and cross-linking agent.

The heat-expandable microspheres of the present invention can be produced in a process, for example, the process described above, though the production process is not restricted within the scope of such process. The description about the heat-expandable microspheres and its application, which are contained in the description of the process mentioned above, may be hereinafter sometimes omitted to avoid redundancy. In this case, the description of the process mentioned above should be applied.

The average particle size of the heat-expandable microspheres is not specifically restricted, but should usually range from 1 to 100 µm, preferably from 2 to 80 µm, more preferably from 3 to 60 µm, and further more preferably from 5 to 50 µm. Heat-expandable microspheres having an average particle size smaller than 1 µm may have thin shell through which the blowing agent is apt to escape and may not have good thermal expansion performance. On the other hand, heat-expandable microspheres having an average particle size greater than 100 µm may have shell of uneven thickness which causes poor thermal expansion performance of the microspheres.

The coefficient of variation, CV, in the particle size distribution of the heat-expandable microspheres is not specifically restricted, but should preferably be not greater than 35%, more preferably not greater than 30%, and most preferably not greater than 25%. The coefficient of variation, CV, can be calculated by the expressions (1) and (2) shown below.

[Expression 1]

$$CV = (s/\langle x \rangle) \times 100 \text{ (percent)} \qquad (1)$$

$$s = \left\{ \sum_{i=1}^{n} (xi - \langle x \rangle)^2 / (n-1) \right\}^{1/2} \qquad (2)$$

where "s" represents a standard deviation of the particle size, $\langle x \rangle$ represents the average particle size, "xi" represents the particle size of the i-th particle, and "n" represents the number of particles.

The encapsulation ratio of a blowing agent encapsulated in heat-expandable microspheres is not specifically restricted, but should preferably range from 2 to 60 wt %, more preferably from 5 to 50 wt %, further more preferably from 8 to 45 wt %, and most preferably from 10 to 40 wt % of the weight of the heat-expandable microspheres.

The amount of DMF-insoluble matter ($G_1$) in the present invention is defined to be the ratio of heat-expandable microspheres which are left undissolved after they are shaken in DMF (N,N-dimethylformamide) (refer to Examples). High amount of DMF-insoluble matter implies that the thermoplastic resin shell of the microspheres has dense structure owing to the cross-linking by a cross-linking agent and has high solvent resistance. Heat-expandable microspheres of high amount of DMF-insoluble matter enable minimized escape of the encapsulated blowing agent through their shells, which become thin in thermal expansion, and thus retain good thermal expansion performance.

On the other hand, the amount of DMF-MEK-insoluble matter ($G_2$) in the present invention is defined to be the ratio of heat-expandable microspheres which are left undissolved after they are shaken in the DMF-MEK mixture (50:50 (in weight ratio) mixture of N,N-dimethylformamide and methyl ethyl ketone) (refer to Examples). Like as the amount of DMF-insoluble matter ($G_1$), high amount of DMF-MEK-insoluble matter ($G_2$) implies that the thermoplastic resin shell of the microspheres has dense structure owing to the cross-linking by a cross-linking agent and has high solvent resistance.

Then the technical significance of the ratio of $G_1$ to $G_2$, or $G_2:G_1$ will be explained. The thermoplastic resin constituting the shell of heat-expandable microspheres is a cross-linked polymer.

Generally speaking, $G_1$ is estimated to be smaller than $G_2$ ($G_1 < G_2$) if the cross-linking density is almost uniform throughout the structure of a shell, because of higher polarity of DMF than that of the DMF-MEK mixture.

The amount of DMF-insoluble matter ($G_1$) of a shell having different cross-linking density between the outermost layer and other parts of the shell, i.e., a shell having variable cross-linking density (for example, comparatively high cross-linking density of the outermost layer and low cross-linking density of other parts) is estimated to be similar to the amount of DMF-insoluble matter ($G_1$) of a shell having almost uniform cross-linking density throughout its structure because of the high polarity of DMF.

On the other hand, the DMF-MEK mixture has lower polarity than that of DMF, and a shell having variable cross-linking density (for example, comparatively high cross-linking density of the outermost layer and low cross-linking density of other parts), i.e., a shell having higher cross-linking density of the outermost layer than that of other parts of the shell, is estimated to be not readily soluble in the DMF-MEK mixture owing to the high cross-linking density of the outermost layer. Thus the amount of DMF-MEK-insoluble matter, $G_2$, and $G_2:G_1$ of the shell having different cross-linking density between the outermost layer and other parts, i.e., having variable cross-linking density (for example, a shell having comparatively high cross-linking density of the outermost layer and low cross-linking density at other parts) are estimated to be greater than the $G_2$ and $G_2:G_1$ of a shell having almost uniform cross-linking density throughout its structure.

Considering the cross-linking density of the shell in relation with the above-mentioned production process, the comparatively high cross-linking density of the outermost layer of the shell is estimated to be the result of a cross-linking agent present at the outer surface of the globules of an oily mixture which are the precursor of the shell. For making a cross-linking agent present at the outer surface of the globules, it is preferable that the cross-linking agent includes hydrophilic cross-linking agent and is contained in the aqueous dispersion medium.

The heat-expandable microspheres of the present invention should have a $G_2:G_1$, a ratio of the amount of DMF-insoluble matter ($G_1$) to the amount of DMF-MEK-insoluble matter ($G_2$), preferably satisfy the expression $1.05 < G_2:G_1$, more preferably $1.08 < G_2:G_1 < 5$, further more preferably $1.12 < G_2:G_1 < 4.5$, yet further more preferably $1.15 < G_2:G_1 < 4$, and most preferably $1.20 < G_2:G_1 < 3$. A $G_2:G_1$ satisfying the expression mentioned above is estimated to indicate that the shell is densely cross-linked at its outermost layer and has high solvent resistance. Such $G_2:G_1$ also indicates that the thermoplastic resin shell does not lose its softness and prevents the escape of vaporized blowing agent from the microspheres to effectively retain encapsulated blowing agent. Thus the heat-expandable microspheres have high thermal expansion performance.

Heat-expandable microspheres exhibiting $G_2:G_1$ of 1.05 or less are estimated to have the shell which is not densely cross-linked at its outermost layer but has almost uniform cross-linking density throughout the shell. Such heat-expandable microspheres are estimated to have poor thermal expansion performance rather than good thermal expansion performance, and their solvent resistance is not sufficient. On the other hand, heat-expandable microspheres exhibiting $G_2:G_1$ of 5 or more have low amount of DMF-insoluble matter ($G_1$) and are estimated to have poor solvent resistance.

A polyurethane composition comprising polyurethane and conventional heat-expandable microspheres dispersed in DMF-containing solvent remarkably lost its expanding performance with time. Such time-dependent decrease in the expanding performance of the composition will be greatly restrained, if the heat-expandable microspheres of the present invention, which have high solvent resistance, are employed instead of conventional heat-expandable microspheres.

The expansion-initiating temperature ($T_s$) of the heat-expandable microspheres is not specifically restricted, but should preferably be at least 60° C., more preferably at least 70° C., further more preferably at least 80° C., yet further more preferably at least 90° C., and most preferably at least 100° C. The upper limit of the expansion-initiating temperature is 180° C. The expansion-initiating temperature ($T_s$) is the temperature at which heat-expandable microspheres pressurized with a compression unit to 0.01 N and heated with increasing temperature from 20 to 300° C. at a rate of 10° C./min start to change the position of the compression unit to a positive direction, which is measured as a height in vertical direction.

The maximum expansion ratio of the heat-expandable microspheres is not specifically restricted, but should preferably be at least 30 times, more preferably at least 45 times, further preferably at least 56 times, still further preferably at least 59 times, further more preferably at least 62 times, still further more preferably at least 65 times, and most preferably at least 80 times. The upper limit of the maximum expansion ratio of heat-expandable microspheres is 200 times.

The maximum expansion temperature ($T_{max}$, ° C.) of the heat-expandable microspheres is not specifically restricted, but should preferably be at least 80° C., more preferably at least 90° C., further preferably at least 100° C., further more preferably at least 110° C., and most preferably at least 120° C. The upper limit of the maximum expansion temperature of the heat-expandable microspheres is 350° C. The maximum expansion temperature ($T_{max}$) is measured in the procedure of pressurizing the heat-expandable microspheres to 0.01 N with a compression unit, heating the microspheres with increasing temperature from 20 to 300° C. at a rate of 10° C./min, measuring the change of the position of the compression unit as a height in vertical direction, and determining the temperature at which the compression unit reaches the highest position ($H_{max}$, μm).

The highest position ($H_{max}$) of the compression unit given by heat-expandable microspheres is not specifically restricted, but should preferably be at least 1000 μm, more preferably at least 1300 μm, further more preferably at least 1500 μm, yet further more preferably at least 2000 μm, and most preferably at least 2500 μm. The upper limit of the highest position of the compression unit given by heat-expandable microspheres is 10000 μm.

The $H_{max}:T_{max}$ (μm/° C.) given by the heat-expandable microspheres of the present invention should preferably satisfy the expression $H_{max}:T_{max} \geq 13$, more preferably $H_{max}:T_{max} \geq 14.5$, further more preferably $H_{max}:T_{max} \geq 15$, yet further more preferably $H_{max}:T_{max} \geq 15.5$, and most preferably $H_{max}:T_{max} \geq 16$. The upper limit of $H_{max}:T_{max}$ is 60. A ratio of $H_{max}:T_{max}$ less than 13 indicates that the heat-expandable micro spheres may have poor thermal expansion performance and solvent resistance.

The technical significance of the ratio of $H_{max}$ to $T_{max}$, $H_{max}:T_{max}$, will be explained. As mentioned above, the maximum expansion temperature ($T_{max}$) means the temperature at which heat-expandable microspheres expand to raise the compression unit to the highest position ($H_{max}$). The heat-expandable microspheres of the present invention give high $H_{max}:T_{max}$, and the data means that the heat-expandable microspheres expand enough without decrease of their maximum expansion ratio indicated by $H_{max}$, even if their maximum expansion temperature is increased. The shell of the heat-expandable microspheres is not hard but soft enough as a whole and the microspheres expand much better than conventional microspheres at the same temperature. A shell having almost uniform and comparatively high cross-linking density is hard as a whole, in other words, the shell is not soft. On the other hand, a shell which is not hard and has soft texture as a whole is estimated to have different cross-linking density between the outermost layer and other parts, in other words, variable cross-linking density (for example, comparatively high cross-linking density of the outermost layer and low cross-linking density of other parts). Such shell containing a part having comparatively high cross-linking density contributes to high solvent resistance of the heat-expandable microspheres.

The hollow particles of the present invention can be produced by heating and expanding the heat-expandable microspheres mentioned above and/or the heat-expandable microspheres produced in the above-mentioned process for producing heat-expandable microspheres. The thermal expansion method is not specifically restricted, and can include dry thermal expansion methods and wet thermal expansion methods.

The examples of the dry thermal expansion methods are those described in JP A 2006-213930, especially, the injection method. Other dry thermal expansion methods are those described in JP A 2006-96963. The examples of the wet thermal expansion methods are those described in JP A 62-201231.

The particle size of the hollow particles is not specifically restricted, but should preferably range from 1 to 1000 μm, more preferably from 5 to 800 μm, and most preferably from 10 to 500 μm. The coefficient of variation, CV, of the particle size distribution of the hollow particles is not specifically restricted, but should preferably be not greater than 30%, more preferably not greater than 27%, and further preferably not greater than 25%.

The composition of the present invention comprises at least one particulate material selected from the group consisting of the heat-expandable microspheres of the present invention, heat-expandable microspheres produced in the production process of the present invention, and hollow particles of the present invention; and a base component.

The base component is not specifically restricted, and includes, for example, rubbers, such as natural rubber, butyl rubber, silicone rubber and ethylene-propylene-diene rubber (EPDM); thermosetting resins, such as epoxy resins and phenolic resins; waxes, such as polyethylene wax and paraffin wax; thermoplastic resins, such as ethylene-vinyl acetate copolymer(EVA), ionomer, polyethylene, polypropylene, polyvinyl chloride (PVC), acrylic resin, thermoplastic polyurethane, acrylonitrile-styrene copolymer (AS resin), acrylonitrile-butadiene-styrene copolymer (ABS resin), polystyrene (PS), polyamide resin (nylon6, nylon66 etc.), polycarbonate, polyethylene terephthalate (PET), polybutylene terephthalate (PBT), polyacetal (POM) and polyphenylene sulfide (PPS); thermoplastic elastomers such as olefin elastomers and styrene elastomers; bioplastics, such as polylactic acid (PLA), cellulose acetate, PBS, PHA and starch resin; sealing materials, such as modified silicones, urethanes, polysulfides, acrylates, silicones, polyisobutylenes and butyl rubbers; paint components, such as urethanes, ethylene-vinyl acetate copolymers, vinyl chlorides and acrylates; and inorganic materials, such as cement, mortar and cordierite.

The composition of the present invention can be prepared by mixing the base component, heat-expandable microspheres and/or hollow particles.

The application of the composition of the present invention includes, for example, molding compositions, paint compositions, clay compositions, fiber compositions, adhesive compositions, and powder compositions.

The composition of the present invention can be employed as the master-batch composition for resin molding, if the composition contains heat-expandable microspheres, and, as a base component, a compound and/or thermoplastic resin having a melting point lower than the expansion-initiating temperature of the heat-expandable microspheres, for example, waxes such as polyethylene wax and paraffin wax; thermoplastic resins, such as ethylene-vinyl acetate copolymer (EVA), ionomer, polyethylene, polypropylene, polyvinyl chloride (PVC), acrylic resin, thermoplastic polyurethane, acrylonitrile-styrene copolymer (AS resin), acrylonitrile-butadiene-styrene copolymer (ABS resin), polystyrene (PS), polycarbonate, polyethylene terephthalate (PET) and polybutylene terephthalate (PBT); and thermoplastic elastomers, such as olefin elastomers and styrene elastomers. The master-batch composition for resin molding can be employed in injection molding, extrusion molding and press molding, and is preferably employed for introducing bubbles in the compositions for resin molding. The resin employed for resin molding is not specifically restricted, except that it is selected from the base components mentioned above, and include, for example, ethylene-vinyl acetate copolymer (EVA), ionomer, polyethylene, polypropylene, polyvinyl chloride (PVC), acrylic resin, thermoplastic polyurethane, acrylonitrile-styrene copolymer (AS resin), acrylonitrile-butadiene-styrene copolymer (ABS resin), polystyrene (PS), polyamide resin (nylon6, nylon66, etc.), polycarbonate, polyethylene terephthalate (PET), polybutylene terephthalate (PBT), polyacetal (POM), polyphenylene sulfide (PPS), olefin elastomers, styrene elastomers, polylactic acid (PLA), cellulose acetate, PBS, PHA, starch resin, natural rubber, butyl rubber, silicone rubber, ethylene-propylene-diene rubber (EPDM), and a mixture thereof. The composition can contain reinforcing fibers, such as glass fiber and carbon fiber.

The formed product of the present invention can be manufactured by forming the composition. The formed product of the present invention includes, for example, formed articles and formed materials such as coating films. The formed product of the present invention has improved properties including, light weight property, porousness, sound absorbency, thermal insulation property, low thermal conductivity, low dielectric constant, design, shock absorption and strength.

A formed product containing an inorganic compound as a base component can be processed into ceramic filters, etc. by calcination.

EXAMPLE

The heat-expandable microspheres of the present invention are specifically explained with the following Examples, though the present invention is not restricted within the scope of the Examples. In the following Examples and Comparative examples, "%" means "wt %" and "part" means "part by weight" unless otherwise specified.

The properties and performances of the heat-expandable microspheres described in the following Examples of production, Examples and Comparative examples were measured and evaluated in the methods described below.

Determination of Average Particle Size and Particle Size Distribution

A Microtrac particle size analyzer (9320-HRA, manufactured by Nikkiso Co., Ltd.) was employed as the device for the determination of the D50 value, which was defined as the average particle size.

Determination of the Moisture Content ($C_w$) of Heat-expandable Microspheres

The moisture content was determined with a Karl Fischer moisture meter (MKA-510N, produced by Kyoto Electronics Manufacturing Co., Ltd.).

Determination of the Encapsulation Ratio (CR) of a Blowing Agent Encapsulated in Heat-expandable Microspheres In a stainless steel evaporating dish (15 mm deep and 80 mm in diameter), 1.0 g of heat-expandable microspheres was placed, and weighed out ($W_1$). Then 30 ml of acetonitrile was added to disperse the microspheres uniformly. After being left for 24 hours at room temperature, the microspheres were dried at 130° C. for 2 hours under reduced pressure, and the dry weight ($W_2$) was determined. The encapsulation ratio of the encapsulated blowing agent (CR) was calculated by the following expression.

$$CR(\text{wt \%}) = (W1-W2)(g)/1.0(g) \times 100 - (Cw)(\text{wt \%})$$

(The moisture content in the expression was determined by the method described above.)

Determination of Amount of DMF (N,N-Dimethylformamide)-Insoluble Matter ($G_1$)

In a glass vessel (36 mm in inside diameter) conditioned to a constant weight ($WP_0$), 1 g of heat-expandable microspheres and 29 g of DMF were placed and shaken at 25° C. for 24 hours (with a desktop shaker, NR-30, produced by Taitec Co., Ltd., at a shaking rate of 15 min-1). The mixture was separated with a desktop cooling centrifuge (H-3R, produced by Kokusan Co., Ltd., with a RF-110 rotor and MC-110 bucket) at the rate of 3500 rpm at 15° C. for 1 hour. Then the supernatant liquid was removed and the gel in the glass vessel was vacuum-dried and solidified at 130° C. for 1 hour. The dried gel in the glass vessel was transferred to a desiccator containing silica gel to be cooled down to room temperature. The weight ($WP_2$) of the glass vessel containing the dried gel was measured, and the weight of the heat-expandable microspheres insoluble in DMF (WP) was calculated by the following expression.

$$WP = WP_2 - WP_0$$

The weight of the polymer ($WP_1$) in 1 g of the heat-expandable microspheres was calculated by the following expression from the encapsulation ratio, CR (%), of the blowing agent encapsulated in the microspheres and the moisture content, Cw (%), of the microspheres determined in the methods mentioned above.

$$WP_1 = 1 - (CR + C_w)/100$$

Then the amount of DMF-insoluble matter ($G_1$, wt %) of heat-expandable microspheres was calculated by the following expression from the weight of the polymer ($WP_1$) and the weight of the heat-expandable microspheres insoluble in DMF (WP) in 1 g of the heat-expandable microspheres.

Amount of DMF-insoluble matter ($G1$,wt %)=(WP/WP1)×100

Determination of Amount of DMF-MEK-Insoluble Matter ($G_2$)

The 50:50 (in weight ratio) mixture of N,N-dimethylformamide (DMF) and methyl ethyl ketone (MEK) was prepared.

The amount of DMF-MEK-insoluble matter ($G_2$) of heat-expandable microspheres was determined in the same manner as that for amount of DMF-insoluble matter mentioned above except that the DMF-MEK mixture was employed instead of DMF.

Determination of the Expansion-Initiating Temperature ($T_s$), the Highest Position of the Compression Unit ($H_{max}$), and the Maximum-Expansion Temperature $T_{max}$)

A DMA (a kinetic viscoelasticity measuring device, DMA Q800, manufactured by TA Instruments) was employed for the measurement. In an aluminum cup of 6.0 mm in diameter (5.65 mm in inside diameter) and 4.8 mm deep, 0.5 mg of heat-expandable microspheres was placed, and the cup was covered with an aluminum cap (0.1 mm thick and 5.6 mm in diameter) to prepare a sample. The sample was compressed with the compression unit of the device to 0.01 N, and the height of the sample was measured. The sample was then heated with increasing temperature from 20 to 300° C. at a rate of 10° C./min, being compressed with the compression unit to 0.01 N, and the vertical change of the position of the compression unit was measured. The temperature at which the compression unit started to change its position to the positive direction was determined as the expansion-initiating temperature ($T_s$), and the temperature at which the compression unit reached the highest position ($H_{max}$) was determined as the maximum-expansion temperature ($T_{max}$).

Determination of the Weight of the Hydrophilic Cross-Linking Agent ($X_w$) Contained in the Aqueous Dispersion Medium at the Start of Polymerization A dispersion breaker was added to an aqueous suspension composed of globules of an oily mixture dispersed in an aqueous dispersion medium to separate the suspension into two phases, the oily mixture and aqueous dispersion medium, and the aqueous dispersion medium was taken out. The weight of the hydrophilic cross-linking agent ($X_w$) in the taken-out aqueous dispersion medium was determined with an Alliance HPLC System 2690 (produced by Waters Corporation).

Determination of the Weight of the Hydrophilic Cross-Linking Agent ($X_o$) Contained in the Oily Mixture at the Start of Polymerization The weight of the hydrophilic cross-linking agent ($X_o$) contained in the oily mixture constituting globules was calculated by the following expression from the weight of the whole of the hydrophilic cross-linking agent used for polymerization (X) and the weight of the hydrophilic cross-linking agent ($X_w$) determined above.

$X_o = X - X_w$

Determination of the Weight of the Lipophilic Cross-Linking Agent ($Y_w$) Contained in the Aqueous Dispersion Medium at the Start of Polymerization The weight of the lipophilic cross-linking agent ($Y_w$) contained in the aqueous dispersion medium was determined with an Alliance HPLC System 2690 (produced by Waters Corporation) in the same manner as that for the determination of the weight of the hydrophilic cross-linking agent ($X_w$) mentioned above.

Determination of the Weight of the Lipophilic Cross-Linking Agent ($Y_o$) Contained in the Oily Mixture at the Start of Polymerization The weight of the lipophilic cross-linking agent ($Y_o$) contained in the oily mixture constituting globules was calculated by the following expression from the weight of the whole of the lipophilic cross-linking agent used for polymerization (Y) and the weight of the lipophilic cross-linking agent ($Y_w$) determined above.

$Y_o = Y - Y_w$

Example 1

An aqueous dispersion medium was prepared by uniformly dissolving 0.6 parts by weight of 1,3,5-triacryloyl-hexahydro-1,3,5-triazine, a hydrophilic cross-linking agent, and 165 parts by weight of sodium chloride in 700 parts by weight of deionized water, adding 0.8 parts by weight of polyvinyl pyrolidone, 0.15 parts by weight of carboxymethylated polyethyleneimine sodium salt and 16 parts by weight of colloidal silica, and controlling the pH of the mixture in the range from 2.8 to 3.2.

An oily mixture was prepared by mixing and dissolving 150 parts by weight of acrylonitrile, 135 parts by weight of methacrylonitrile, 15 parts by weight of methyl methacrylate, 1.6 parts by weight of 2,2'-azobis(2,4-dimethyl valeronitrile), 1.5 parts by weight of 1,1'-azobis(cyclohexane-1-carbonitrile), 30 parts by weight of isopentane, 15 parts by weight of normal pentane and 10 parts by weight of isopentane.

The aqueous dispersion medium containing a hydrophilic cross-linking agent and the oily mixture prepared above were mixed, and the mixture was dispersed with a Homo-mixer (T.K. Homo-mixer manufactured by Tokushu Kika Kogyou) at 10000 rpm for 1 min to be prepared into an aqueous suspension in which globules of the oily mixture were dispersed in the aqueous dispersion medium.

The aqueous suspension was transferred into a compressive reactor of 1.5-liter capacity, purged with nitrogen, subjected to the initial reaction pressure of 0.3 MPa, and polymerized at 65° C. for 15 hours and at 75° C. for 5 hours with agitation at 100 rpm. After the polymerization, the polymerization product was filtered and dried into heat-expandable microspheres.

A part of the aqueous suspension was sampled at the start of the polymerization, and a suspension breaker was added to the sample to separate it into two phases of the oily mixture and aqueous dispersion medium. The amount of the hydrophilic cross-linking agent in the aqueous dispersion medium was determined to be 0.15 parts by weight of 100 parts by weight of the monomer component. The weight ratio of the hydrophilic cross-linking agent contained in the aqueous dispersion medium was 75 wt % of the whole of the cross-linking agent.

The amount of DMF-insoluble matter (G1) and the amount of DMF-MEK-insoluble matter ($G_2$) of the resultant heat-expandable microspheres were determined and the value of $G_2$:$G_1$ was 1.23. The value of the $H_{max}$:$T_{max}$ of the heat-expandable microspheres was 15.8 (μm/° C.).

Examples 2 to 8

Heat-expandable microspheres of Examples 2 to 8 were produced in the same manner as that in Example 1 except that the variant and amount of the monomer component, lipophilic cross-linking agent, polymerization initiator, blowing agent, co-stabilizer, dispersion stabilizer, aqueous additive and hydrophilic cross-linking agent, and reaction conditions such as mixing parameters were replaced by those shown in Table 1. In Examples 5 to 7, a lipophilic cross-linking agent was further added to the oily mixture.

The parts by weight of the hydrophilic cross-linking agent in the aqueous dispersion medium to 100 parts by weight of the monomer component, the weight ratio of the hydrophilic cross-linking agent in the aqueous dispersion medium to the whole of the cross-linking agent, the properties of resultant heat-expandable microspheres including amount of DMF-insoluble matter ($G_1$), amount of DMF-MEK-insoluble matter ($G_2$), $G_2/G_1$ and $H_{max}/T_{max}$ of Examples 2 to 8 are shown in Table 1. In Examples 5 to 8, all of the lipophilic cross-linking agents were contained in the oily mixture constituting globules, while no lipophilic cross-linking agents were contained in any of the aqueous dispersion mediums.

TABLE 1

| | | | | Examples | | | | | | | |
|---|---|---|---|---|---|---|---|---|---|---|---|
| | | | | 1 | 2 | 3 | 4 | 5 | 6 | 7 | 8 |
| Aqueous suspension (parts by weight) | Oily mixture | Monomer component | Acrylonitrile | 150 | 185 | 200 | 200 | 185 | 185 | 185 | 185 |
| | | | Methacrylonitrile | 135 | 100 | 85 | 85 | 100 | 100 | 100 | 100 |
| | | | Methyl methacrylate | 15 | — | — | 15 | 10 | — | 15 | — |
| | | | Isobornyl methacrylate | — | — | 15 | — | — | 15 | — | 15 |
| | | | Styrene | — | 15 | — | — | 5 | — | — | — |
| | | Lipophilic cross-linking agent | Trimethylolpropane trimethacrylate | — | — | — | — | 0.6 | 0.3 | — | — |
| | | | Dimethyloltricyclodecane dimethacrylate | — | — | — | — | — | — | 0.8 | — |
| | | Initiator | Di(2-ethylhexyl) peroxydicarbonate | — | — | 0.1 | — | — | 1.6 | — | 0.2 |
| | | | 2,2'-azobis(2,4-dimethyl valeronitrile) | 1.6 | 1.6 | 2.5 | 2.2 | 2.2 | — | 2.5 | 2.2 |
| | | | 2,2'-azobis isobutylonitrile | — | — | — | — | 0.3 | — | — | — |
| | | | 1,1'-azobis(cyclohexane-1-carbonitrile) | 1.5 | 0.8 | 0.8 | — | — | 0.5 | 0.4 | — |
| | | Blowing agent | Isobutane | 30 | 30 | 30 | 30 | — | 30 | 30 | — |
| | | | Normal pentane | 15 | 35 | 10 | 25 | — | 25 | — | — |
| | | | Isopentane | 10 | — | 15 | — | 120 | — | 25 | 65 |
| | Aqueous dispersion medium | Water | | 700 | 700 | 700 | 700 | 700 | 700 | 700 | 700 |
| | | Electrolyte | Sodium chloride | 165 | 165 | 165 | 165 | 165 | 165 | 165 | 165 |
| | | Co-stabilizer | Polyvinyl pyrolidone | 0.8 | 0.8 | 0.8 | 0.8 | 0.4 | 0.8 | 0.8 | 0.8 |
| | | Dispersion stabilizer | Colloidal silica | 16 | 16 | 16 | 16 | 8 | 16 | 16 | 16 |
| | | Water soluble compound | Aluminum chloride | — | — | 0.12 | 0.2 | — | — | — | — |
| | | | Carboxymethylated polyethyleneimine sodium salt | 0.15 | 0.12 | — | — | 0.15 | 0.13 | 0.16 | 0.1 |
| | | Hydrophilic cross-linking agent | 1,3,5-triacryloylhexahydro-1,3,5-triazine | 0.6 | 1.2 | 1.8 | — | — | — | — | — |
| | | | Triallyl isocyanurate | — | — | — | 0.8 | 0.8 | — | — | — |
| | | | Diethyleneglycol dimethacrylate | — | — | — | — | — | 0.3 | — | — |
| | | | Tripropyleneglycol diacrylate | — | — | — | — | — | — | 0.3 | — |
| | | | PEG(1000) dimethacrylate | — | — | — | — | — | — | — | 0.8 |
| Hydrophilic cross-linking agent in aqueous dispersion medium | | | Amount (parts by weight) | 0.45 | 0.78 | 1.1 | 0.34 | 0.38 | 0.16 | 0.1 | 0.66 |
| | | | Parts by weight to 100 parts by weight of monomer component | 0.15 | 0.25 | 0.36 | 0.11 | 0.12 | 0.05 | 0.03 | 0.22 |
| | | | Weight ratio to the whole of cross-linking agent (wt %) | 75 | 65 | 62 | 42 | 27 | 26 | 8.7 | 82 |
| Test result | | Volume average particle size ($D_{50}$) (μm) | | 24 | 22 | 20 | 22 | 48 | 21 | 19 | 17 |
| | Solvent resistance | | Amount of DMF-insoluble matter ($G_1$) | 55 | 64 | 70 | 63 | 74 | 60 | 61 | 65 |
| | | | Amount of DMF-MEK-insoluble matter ($G_2$) | 68 | 79 | 85 | 79 | 86 | 67 | 69 | 80 |
| | | | $G_2/G_1$ | 1.23 | 1.23 | 1.21 | 1.25 | 1.16 | 1.12 | 1.13 | 1.23 |
| | Expanding performance | | Expansion initiating temperature ($T_s$, °C) | 106 | 108 | 108 | 107 | 127 | 107 | 105 | 123 |
| | | | Maximum expansion temperature ($T_{max}$, °C) | 158 | 160 | 165 | 160 | 176 | 156 | 154 | 164 |
| | | | Highest position ($H_{max}$, μm) | 2500 | 2730 | 2420 | 2800 | 4900 | 2320 | 2200 | 2500 |
| | | | $H_{max}/T_{max}$ | 15.8 | 17.1 | 14.7 | 17 | 27.8 | 14.9 | 14.3 | 15.2 |

In Examples 1 to 8, the monomer component in the globules of the oily mixture is cross-linked at the interface of the globules and aqueous dispersion medium (i.e., oil-water interface) by the hydrophilic cross-linking agent contained in the aqueous dispersion medium and present at the interface simultaneously with the polymerization of the monomer component. Consequently the cross-linking density of the outermost layer of the thermoplastic resin shell is higher than that of other parts of the shell to minimize the escape of vaporized blowing agent from the microspheres. Simultaneously, the thermoplastic resin shell as a whole retains softness to attain high thermal expansion performance of the resultant heat-expandable microspheres.

Comparative Examples 1 to 6

In Comparative examples 1 to 5, heat-expandable microspheres were produced in the same manner as that in Example 1 except that the hydrophilic cross-linking agents were not mixed in the aqueous dispersion media but were added to the oily mixtures as shown in Table 2. The properties of the heat-expandable microspheres of Comparative examples 1 to 5 are also shown in Table 2.

The heat-expandable microspheres of Comparative example 6 were produced in the same manner as that in Example 1 except that 0.75 parts by weight of dimethyloltricyclodecane dimethacrylate, a lipophilic cross-linking agent, was added to the aqueous dispersion medium. In Comparative example 6, dimethyloltricyclodecane dimethacrylate which was not soluble in the aqueous dispersion medium was contained in the oily mixture and subjected to polymerization to produce heat-expandable microspheres. The properties of the heat-expandable microspheres of Comparative example 6 are shown in Table 2.

TABLE 2

| | | | | Comparative examples | | | | | |
|---|---|---|---|---|---|---|---|---|---|
| | | | | 1 | 2 | 3 | 4 | 5 | 6 |
| Aqueous suspension (parts by weight) | Oily mixture | Monomer component | Acrylonitrile | 150 | 200 | 185 | 185 | 185 | 185 |
| | | | Methacrylonitrile | 135 | 85 | 100 | 100 | 100 | 100 |
| | | | Methyl methacrylate | 15 | 15 | — | 15 | — | — |
| | | | Isobornyl methacrylate | — | — | 15 | — | 15 | — |
| | | | Styrene | — | — | — | — | — | 15 |
| | | Hydrophilic cross-linking agent | 1,3,5-triacryloylhexahydro-1,3,5-triazine | 0.6 | — | — | — | — | — |
| | | | Triallyl isocyanurate | — | 0.8 | — | — | — | — |
| | | | Diethyleneglycol dimethacrylate | — | — | 0.3 | — | — | — |
| | | | Tripropyleneglycol diacrylate | — | — | — | 0.3 | — | — |
| | | | PEG(1000) dimethacrylate | — | — | — | — | 0.8 | — |
| | | Lipophilic cross-linking agent | Trimethylolpropane trimethacrylate | — | — | 0.3 | — | — | — |
| | | | Dimethyloltricyclodecane dimethacrylate | — | — | — | 0.8 | — | — |
| | | Initiator | Di(2-ethylhexyl) peroxydicarbonate | — | — | 1.6 | — | 0.2 | 0.2 |
| | | | 2,2'-azobis(2,4-dimethyl valeronitrile) | 1.6 | 2.2 | — | 2.5 | 2.2 | 2.2 |
| | | | 2,2'-azobis isobutylonitrile | — | — | — | — | — | — |
| | | | 1,1'-azobis(cyclohexane-1-carbonitrile) | 1.5 | — | 0.5 | 0.4 | — | — |
| | | Blowing agent | Isobutane | 30 | 30 | 30 | 30 | — | — |
| | | | Normal pentane | 15 | 25 | 25 | — | — | — |
| | | | Isopentane | 10 | — | — | 25 | 65 | 80 |
| | Aqueous dispersion medium | Water | | 700 | 700 | 700 | 700 | 700 | 700 |
| | | Electrolyte | Sodium chloride | 165 | 165 | 165 | 165 | 165 | 165 |
| | | Co-stabilizer | Polyvinyl pyrolidone | 0.8 | 0.8 | 0.8 | 0.8 | 0.8 | 0.5 |
| | | Dispersion stabilizer | Colloidal silica | 16 | 16 | 16 | 16 | 16 | 10 |
| | | Water soluble compound | Aluminum chloride | — | 0.2 | — | — | — | — |
| | | | Carboxymethylated polyethyleneimine sodium salt | 0.15 | — | 0.13 | 0.16 | 0.1 | 0.1 |
| | | Lipophilic cross-linking agent | Dimethyloltricyclodecane dimethacrylate | — | — | — | — | — | 0.75* |
| Hydrophilic cross-linking agent in aqueous dispersion medium | | | Amount (parts by weight) | 0 | 0 | 0 | 0 | 0 | 0 |
| | | | Parts by weight to 100 parts by weight of monomer component | 0 | 0 | 0 | 0 | 0 | 0 |
| | | | Weight ratio to the whole of cross-linking agent (wt %) | — | — | — | — | — | — |
| Test result | | Volume average particle size ($D_{50}$) (μm) | | 23 | 25 | 20 | 22 | 16 | 36 |
| | | Solvent resistance | Amount of DMF-insoluble matter ($G_1$) | 55 | 64 | 61 | 59 | 70 | 80 |
| | | | Amount of DMF-MEK-insoluble matter ($G_1$) | 57 | 67 | 64 | 61 | 73 | 81 |
| | | | $G_2/G_1$ | 1.04 | 1.05 | 1.05 | 1.03 | 1.04 | 1.01 |
| | | Expanding performance | Expansion initiating temperature ($T_s$, °C.) | 107 | 107 | 105 | 109 | 123 | 130 |
| | | | Maximum expansion temperature ($T_{max}$, °C.) | 155 | 151 | 155 | 155 | 162 | 168 |
| | | | Highest position ($H_{max}$, μm) | 1200 | 1600 | 1200 | 1300 | 1250 | 1800 |
| | | | $H_{max}/T_{max}$ | 7.7 | 10.6 | 7.7 | 8.4 | 7.7 | 10.7 |

*In Comparative example 6, the lipophilic cross-linking agent which was not soluble in the aqueous dispersion medium was mixed in the oily mixture and subjected to polymerization.

In Comparative examples 1 to 6, hydrophilic cross-linking agents were not detected in the aqueous dispersion mediums.

Example 9

A polyvinyl chloride paste was prepared by mixing 900 g of polyvinyl chloride resin (E-701, supplied by Vestolit), 850 g of calcium carbonate (BF-200, supplied by Bihoku Funka Kogyo, Co., Ltd.) and 1500 g of diisononyl phthalate. To 100 g of the paste, 1 g of the heat-expandable microspheres produced in Example 1 was added and dispersed by agitation with a TK Homodisper (Type 25, manufactured by Primix Corporation) at 700 rpm for 5 min to be prepared into a composition. The composition was spread in 1.5 mm thick on two electrodeposition-coated sheets (1 mm thick) to be prepared into two samples of coating film.

One of the coating film samples was heated at 140° C. for 30 minutes to be formed into a product containing hollow particles. The other coating film sample was heated at 150° C. for 30 minutes to be formed into a product containing hollow particles.

The true specific gravity of the resultant products was measured with an analytical balance AX200 and a specific gravity measurement kit SMK-301 (both manufactured by Shimadzu Corporation) and the result is shown in Table 3.

Example 10

A composition, coating film samples, and formed products were prepared in the same manner as that in Example 9, except that the heat-expandable microspheres produced in Example 1 was replaced by the heat-expandable microspheres produced in Example 4. The true specific gravity of the formed products was measured in the same manner as that in Example 9 and the result is shown in Table 3.

Comparative Examples 7 and 8

A composition, coating film samples, and formed products were prepared in the same manner as that in Example 9, except that the heat-expandable microspheres produced in Example 1 was replaced by the heat-expandable microspheres produced in Comparative example 1 or 2. The true specific gravity of the formed products was measured in the same manner as that in Example 9 and the result is shown in Table 3.

TABLE 3

|  | Example 9 | Example 10 | Comparative example 7 | Comparative example 8 |
| --- | --- | --- | --- | --- |
| Heat-expandable micro sphere | Microspheres in Example 1 | Microspheres in Example 4 | Microspheres in Comparative example 1 | Microspheres in Comparative example 2 |
| Heating temperature (° C.) | 140    150 | 140    150 | 140    150 | 140    150 |
| Heating time (min.) | 30     30 | 30     30 | 30     30 | 30     30 |
| True specific gravity of formed products | 0.73   0.7 | 0.72   0.69 | 0.81   0.8 | 0.78   0.77 |

In Examples 9 and 10, the formed products were more lightweight than the products in Comparative examples 7 and 8, owing to the heat-expandable microspheres of better thermal expansion performance produced in Examples 1 and 4.

INDUSTRIAL APPLICABILITY

The heat-expandable microspheres of the present invention can be employed for reducing the weight of putties, paints, inks, sealing materials, mortars, paper clay, pottery and rubbers, or for manufacturing molded products of good sound insulation, thermal insulation, heat shielding and sound absorption performance by blending with a base material and processing in injection molding, extrusion molding or press molding.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

The invention claimed is:

1. A process for producing heat-expandable microspheres comprising a thermoplastic resin shell and a thermally-vaporizable blowing agent encapsulated therein, and having an average particle size ranging from 1 to 100 μm, the process comprising:
preparing an aqueous suspension comprising oily globules dispersed in an aqueous dispersion medium containing a hydrophilic cross-linking agent, wherein the oily globules are made of an oily mixture comprising the blowing agent and a monomer component,
and polymerizing the monomer component,
wherein the hydrophilic cross-linking agent contains a combination of at least two compounds selected from a compound (2), a compound (3), a compound (4), and a compound (5) shown below:

[Chem. 1]

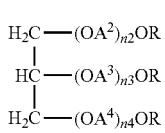

(2)

where R is a (meth)acryloyl group and each of the three Rs may be the same or different; each of $A^2$ to $A^4$ is an alkylene group having a carbon number of 1 to 4 and may be the same or different and each of n2 to n4 is a positive number of at least 1 and the sum of n2 to n4 is at least 6;

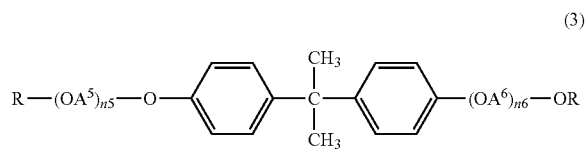

(3)

where R in compound (3) is a (meth)acryloyl group and each of the two Rs in compound (3) may be the same or different; each of $A^5$ and $A^6$ is an alkylene group having a carbon number of 1 to 4 and may be the same or different; and each of n5 and n6 is a positive number of at least 1 and may be the same or different, and the sum of n5 and n6 is at least 6;

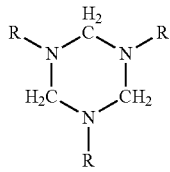
(4)

where R in compound (4) is a (meth)acryloyl group and each of the three Rs in compound (4) may be the same or different; and

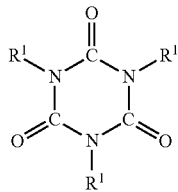
(5)

where $R^1$ is a $C_2$-$C_4$ alkenyl group and each of the three $R^1$s may be the same or different.

2. The process for producing heat-expandable microspheres as claimed in claim 1, wherein the aqueous dispersion medium contains the hydrophilic cross-linking agent in an amount of from 0.01 to 1 parts by weight to 100 parts by weight of the monomer component.

3. The process for producing heat-expandable microspheres as claimed in claim 1, wherein the monomer component comprises a nitrile monomer.

4. The process for producing heat-expandable microspheres as claimed in claim 1, wherein the globules comprise one or both of a hydrophilic cross-linking agent and a lipophilic cross-linking agent.

5. The process for producing heat-expandable microspheres as claimed in claim 1, wherein the amount of the hydrophilic cross-linking agent is at least 5 wt % of the entire amount of cross-linking agent contained in the aqueous dispersion medium.

6. The process for producing heat-expandable microspheres as claimed in claim 1, wherein the hydrophilic cross-linking agent contains the compounds (4) and (5).

7. The process for producing heat-expandable microspheres as claimed in claim 1, wherein the hydrophilic cross-linking agent contains the compound (5).

* * * * *